United States Patent [19]

Ishibashi et al.

[11] 4,284,876
[45] Aug. 18, 1981

[54] THERMAL PRINTING SYSTEM

[75] Inventors: Norio Ishibashi; Kazuo Nakano, both of Tokyo, Japan

[73] Assignee: OKI Electric Industry Co., Ltd., Tokyo, Japan

[21] Appl. No.: 137,784

[22] Filed: Apr. 7, 1980

[30] Foreign Application Priority Data

Apr. 24, 1979 [JP] Japan .................................. 54/49787
Apr. 24, 1979 [JP] Japan .................................. 54/49788

[51] Int. Cl.³ ............................................. H05B 1/00
[52] U.S. Cl. .................................... 219/216; 101/426
[58] Field of Search ................. 219/216, 543; 338/287, 338/308, 309; 346/76 R; 427/96, 102; 432/59, 227; 29/620; 101/426; 355/3

[56] References Cited

U.S. PATENT DOCUMENTS

| | | | |
|---|---|---|---|
| 3,609,294 | 9/1971 | Cady et al. | 219/216 |
| 3,684,858 | 8/1972 | Buck | 219/216 |
| 3,934,112 | 1/1976 | Lakhani | 219/216 |
| 3,984,809 | 10/1976 | Dertouzos et al. | 346/76 R |
| 4,136,274 | 1/1979 | Shibata et al. | 219/216 |

OTHER PUBLICATIONS

*Thermal Printer with Newly Developed Thin–Film Printing Head,* "Proceeding of the S.I.D.", pp. 1, 23–30, vol. 19/1, 1st Quarter 1978.

*Primary Examiner*—Volodymyr Y. Mayewsky
*Attorney, Agent, or Firm*—Armstrong, Nikaido, Marmelstein & Kubovcik

[57] ABSTRACT

A thermal printing system having a plurality of thermal elements aligned on a straight line in the direction perpendicular to the moving direction of a thermal paper for printing characters on a dot matrix principle has been found. Each thermal element is selectively energized by a power pulse according to the desired pattern to be printed, and the pulse width of said power pulse which is applied to a thermal element is controlled according to the moving speed of a thermal paper and/or the status (black/white) of the previously printed several dots so that the desired concentration or color density is obtained. A digital memory which stores the status of the previously printed dots or the duration between the time that the last black dot is printed and the present time is provided, and according to that digital memory, the trigger pulse for initiating the power pulse for each thermal element is defined. Thus, a thermal paper is always heated to a proper temperature to provide the desired printed concentration in spite of the change of the moving speed of a thermal paper and/or the status of the previously printed dots. Then, the high speed printing and/or the variable speed printing is obtained.

6 Claims, 7 Drawing Figures

THERMAL PRINTING SYSTEM

BACKGROUND OF THE INVENTION

The present invention relates to a thermal printing system, in particular, relates to such a system which improves the operating speed.

A thermal recording system utilizes a thermal head having a series of aligned heat-generating resistor elements. An electric current is applied to each of the heat-generating resistor elements in accordance with the black or white information of a picture cell to be recorded, so that the Joule heat thus generated in the resistor elements is transferred to a heat-sensitive treated thermal paper in close contact with the thermal head for color formation. Such a heat sensitive recording system has been used in fascimile receiver and/or a computer terminal device and the like. An example of the thermal head and the apparatus for supplying the electric power to said thermal head has been shown in the U.S. Pat. No. 3,609,294.

The heat-sensitive color formation theoretically requires a comparatively long time (about 1.5 to 10 mS) for recording, so that, when high-speed recording is required a simultaneous multi-dot recording system which simultaneously records a plurality of dots is used.

The recording by a thermal printing head is carried out by the dot matrix process which generates the desired pattern by heating some thermal head elements selectively synchronized with the paper transfer. The information for selecting particular thermal elements for each desired pattern is usually stored in an integrated circuit (IC) memory.

The concentration or the color density of a thermal paper depends upon many factors, among which the electric power applied to thermal elements and the temperature of a thermal paper just before a thermal paper is heated are the most important factors. That is to say, when the temperature of a thermal paper is low, high power must be applied to a thermal element to obtain the desired density, while when the temperature of a thermal paper is high, less power is enough to provide the desired concentration. According to the particular example, a thermal element is heated by an electric pulse having the pedetermined amplitude and the pulse width of 1.5 milisecond to provide the desired density of color change of a thermal paper. The temperature of the heated thermal element and the heated portion of a thermal paper return to the normal temperature after 10 miliseconds from the time of heating. The duration of that 10 mS is called as a heat storage duration. Therefore, the period for heating a thermal element must be longer than that heat storage duration. If a thermal element is heated within the heat storage duration, the color change would be too dark. Accordingly, a prior thermal printing system takes the period of heating thermal elements longer than the heat storage duration in order to provide the desired color density.

However, said prior thermal printing system has the disadvantage that the printing speed is rather slow, since the period of heating thermal elements is long. Thus, a high speed printer which can print a line in the period of 1.5 to 2.0 milisecond has been almost impossible for a prior thermal printing system.

Further, when a printer is utilized as a facsimile receiver, which uses an information compression for high speed transmission, the printing speed must be variable depending upon the reception rate of the information, and when the reception rate exceeds the printing speed of the receiver, the information can not be printed.

SUMMARY OF THE INVENTION

It is an object, therefore, of the present invention to overcome the disadvantages and limitations of a prior thermal printing system by providing a new and improved thermal printing system.

It is also an object of the present invention to provide a thermal printing system which can operate with a high printing speed.

The above and other objects are attained by a thermal printing system comprising of a plurality of thermal elements aligned in a straight line with close intervals in the direction perpendicular to the moving direction of a thermal paper; a first digital memory which stores the black/white information to be printed for each dot; a second digital memory which stores the information relating to the previously printed informations for each dot; a conversion means for converting the output of the second digital memory to the trigger timing pulse for initiating the heating of each thermal element; and AND circuit means for providing the logical product of said trigger timing pulse and the output of said first digital memory to actuate each thermal element.

According to the embodiment of the present invention, the content of said second digital memory is the status (black/white) of the previously printed several dots.

According to the other embodiment of the present invention, the content of said second digital memory is the duration between the time that the last black dot is printed by the particular thermal element and the present time.

BRIEF DESCRIPTION OF THE DRAWINGS

The foregoing and other objects, features, and attendant advantages of the present invention will be appreciated as the same become better understood by means of the following description and accompanying drawings wherein;

FIG. 5 is the modification of the apparatus of FIG. 3, FIGS. 6A and 6B are the explanatory drawings of the theoretical principle of the present invention.

DESCRIPTION OF THE PREFERRED EMBODIMENTS

Figure 6A:
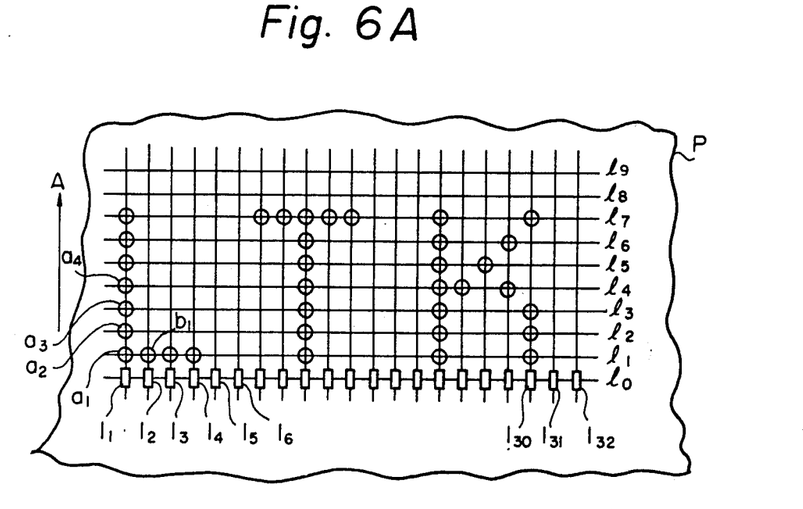
Figure 6B:
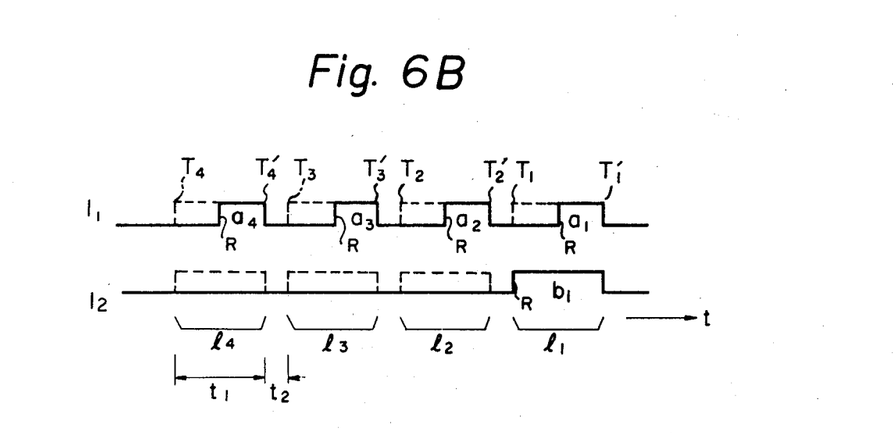

First, the theoretical principle of the present invention is explained in accordance with FIGS. 6A and 6B for the easy understanding of the present invention.

In FIG. 6A, a plurality of thermal elements $1_1$ through $1_{32}$ are aligned on a straight line ($l_0$) in contact with a thermal paper P which moves in the perpendicular direction A to that straight line, and the line $l_0$ is now being printed. The line $l_1$ was printed one cycle before, and the line $l_2$ was printed two cycles before. It should be noted that a desired pattern can be printed by appropriately selecting thermal elements and heats the same on each printing line ($l_9-l_0$). This printing process is called a dot matrix principle.

FIG. 6B shows the waveform of a power pulses (HV) applied to the first two thermal elements $1_1$ and $1_2$. Each power pulse HV has the pulse width ($t_1$) of approximate 1.5 mS for providing the sufficient darkness, and the duration ($t_2$) between the end of the preceding power pulse and the head of the present power pulse is supposed to be shorter than 10 mS. When that duration $t_2$ is longer than 10 mS, a printed dot heated by a thermal element is cooled enough, and so the next power pulse must have the full pulse width (1.5 mS). However, when that duration is shorter than 10 mS, the previously printed dot is not cooled enough until next printing, so the power pulse must be weakened to provide the desired color density. If the power pulse were always constant in spite of the change of the printing duration, the printed density would be too dark and the printed quality would be deteriorated. In FIG. 6B, the thermal element $1_1$ prints the dark dots ($a_4$, $a_3$, $a_2$, $a_1$, etc.) continuously, while the thermal element $1_2$ prints the dot $b_1$ after a long pause. On lines $l_4$, $l_3$, and $l_2$, the pulse width applied to the thermal element $1_1$ is shortened, while the thermal element $1_2$ is not energized as shown in FIG. 6B. On the line $l_1$, the power pulse ($a_1$) applied to the thermal element $1_1$ is also shortened, but the power pulse ($b_1$) applied to the thermal element $1_2$ has the full pulse width.

The control of the pulse width is performed by delaying the rising point R of each power pulse from the reference starting edge ($T_4$, $T_3$, $T_3$, $T_2$, $T_1$). The falling edge ($T_4'$, $T_3'$, $T_2'$, $T_1'$) is not changed in spite of the change of the pulse width.

From the foregoing, it should be appreciated that the pulse width of a power pulse applied to a thermal element is controlled according to a previously printed dot, and that control is performed by adjusting the rising point R of a power pulse.

The present invention is also applicable to a serious printer in which a thermal head has seven elements corresponding to $l_1$ through $l_7$ and the head moves horizontally, while the head in FIG. 6A is fixed and a paper is transferred vertically.

Figure 1:
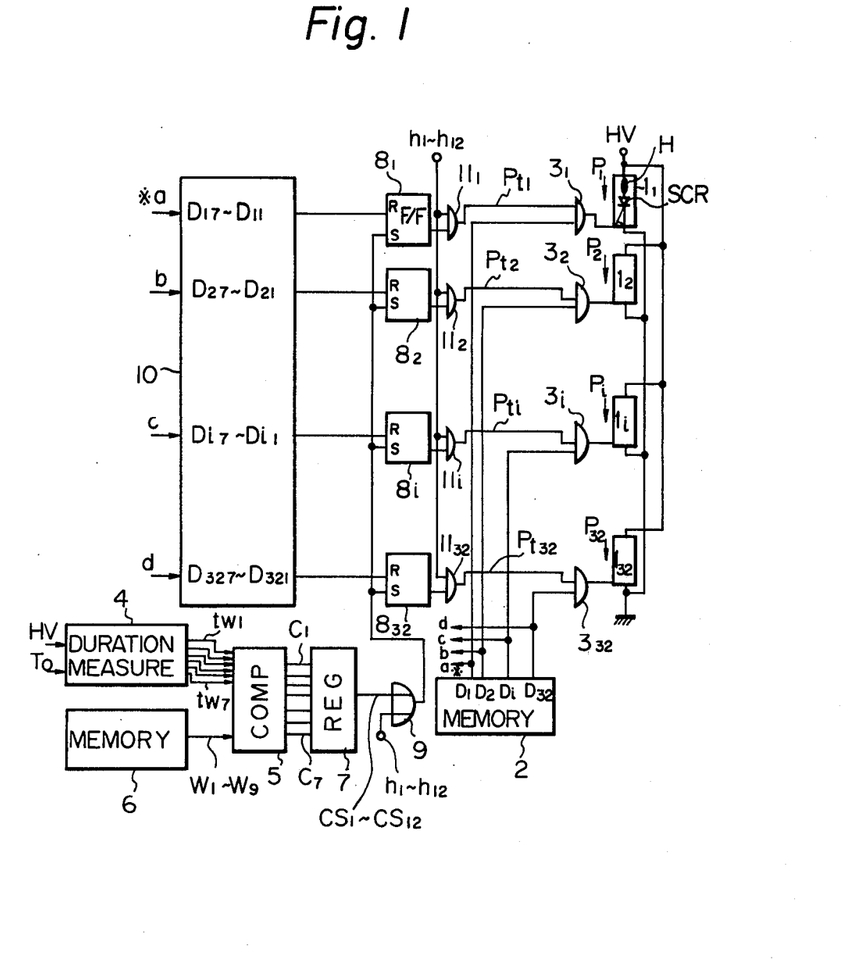
FIG. 1 is the block diagram of the embodiment of the thermal printing system according to the present invention.
Figure 2:
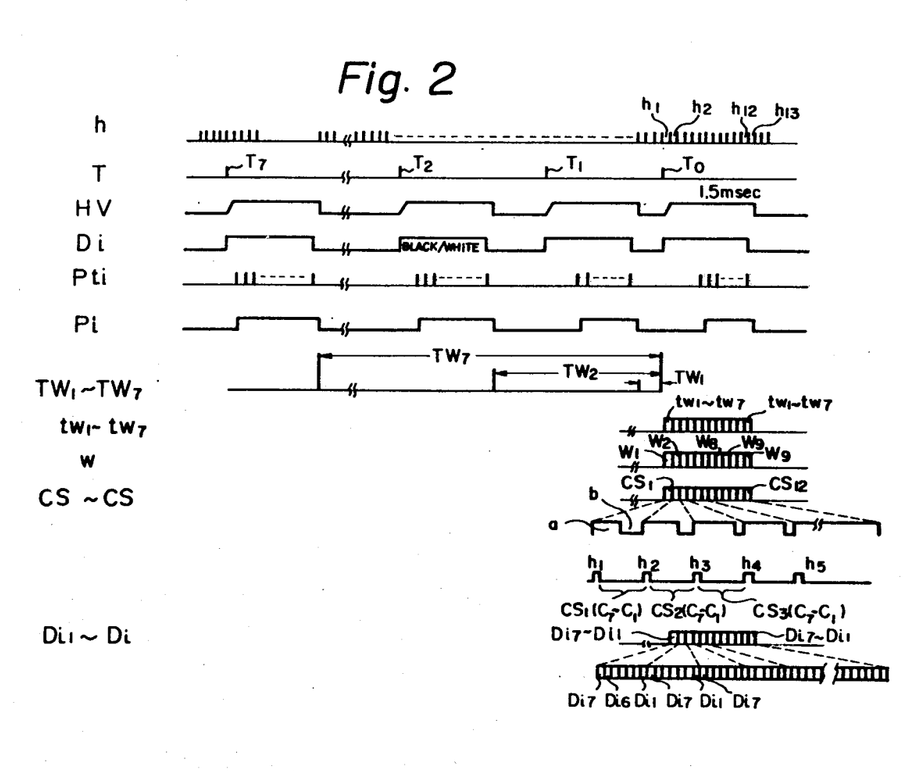
FIG. 2 is the operational time chart of the apparatus of FIG. 1.

FIG. 1 is the block diagram of the first embodiment of the present thermal printing system, and FIG. 2 shows the operational time chart of the apparatus of FIG. 1. In FIG. 1, the reference numerals $1_1$ through $1_{32}$ are thermal elements each having a heater H and a thyristor SCR connected series to said heater H. One end of each heater H is connected to the power terminal HV which applies the power pulse with the predetermined amplitude and the predetermined pulse width to the heater H. The other end of the heater H is connected to the anode of the thyristor SCR, the other end of which is grounded. Therefore, it should be appreciated that when the thyristor is conducted, the electric current flows from the power terminal through the heater H and the thyristor SCR to the ground and the heater H is heated. Those thermal elements $1_1$ through $1_{32}$ are aligned along a straight line for the dot matrix printing, and by selectively heating some thermal elements and transferring a thermal paper with the predetermined speed in the direction perpendicular to that aligned straight line of thermal elements, the desired pattern is printed on a paper.

Each thermal element is designed so that the desired color density is obtained by heating the element by 1.5 milisecond with the predetermined power source from the power terminal HV, and the temperature of the element returns to the normal level in 10 miliseconds. Accordingly, the printing period is longer than 1.5 milisecond. Also, if the particular thermal element is not heated by seven lines (when more than continuous seven lines are white), the duration for heating that element is longer than 10 miliseconds ($1.5 \times 7 = 10.5 > 10$).

The reference numeral 2 is a digital memory which stores the desired pattern for printing, and the memory 2 applies the digital information (1 or 0) to the thermal elements. Of course the digital signal "1" heats the element to print black, and the digital signal "0" does not heat the element to keep the paper white. The memory 2 has 32 outputs $D_1$ through $D_{32}$ corresponding to each thermal element. Those outputs $D_1$ through $D_{32}$ are applied to the corresponding gates of the thyristors SCR of the thermal elements through the corresponding AND circuits $3_1$ through $3_{32}$. Those AND circuits $3_1$ through $3_{32}$ receive the trigger signals $P_{t1}$ through $P_{t32}$ from other AND circuits $11_1$ through $11_{32}$.

Referring now to FIG. 2, the printing control clock pulse (h) has the period of 125 $\mu$S. The symbol T shows the power pulse start timing, in which $T_0$ is the start timing of the present line ($l_0$), $T_1$ is the start timing of the previous line ($l_1$), and $T_7$ is the start timing of the line ($l_7$) which was printed before seven cycles. The power supply HV is risen by the start signal $T_i$ and continues by 12 clock periods of the clock pulse (h), thus, the duration of the power supply HV is 1.5 milisecond ($=125 \mu S \times 12$). The printing information $D_i$ is stored in the digital memory 2 just before the printing start signal $T_i$ occurs, and can be read out from the memory during the 12 clock periods of (h). The start signal $T_i$ also has the paper transfer by one line. The time chart $D_i$ in FIG. 2 represents the read-out information of the memory 2 for the i'th thermal element $1_i$. $P_{ti}$ in FIG. 2 shows the trigger signal which is provided at the output of the AND circuit $11_i \cdot P_i$ in FIG. 2 is the power pulse for printing provided at the output of the AND circuit $3_i$, and it should be appreciated that the thermal element is heated during that presence of that power pulse. The generation of the power pulse $P_i$ depends upon the content of the memory 2. The power pulse $P_i$ is risen by the trigger pulse $P_{ti}$, and is terminated at the end of the power supply HV. That feature of the power pulse $P_i$ is obtained by the feature of a thyristor SCR. That is to say, a thyristor is conducted when a trigger signal is applied to the gate of the thyristor, and the conducted condition continues until the anode voltage of the thyristor becomes zero. The trigger pulse $P_{ti}$ occurs at the output of the AND circuit $11_i$ synchronized with the clock pulse (h), thus, the duration of the power pulse can be adjusted by adjusting the timing of the trigger pulse $P_{ti}$, and since the timing of the trigger pulse is controlled with the step of the clock pulse (h), the duration of the power pulse $P_i$ is also adjustable with the step of the clock pulse ($=125 \mu S$). Therefore, although the pulse width of the power pulse has the error less than 125 $\mu$S, that error is considerably small compared with the usual heating time ($=1.5$ milisecond) and thus that error is not important.

Now, returning to FIG. 1 again, the reference numeral 4 is the printing period measuring unit which measures the duration $TW_1$ through $TW_7$ between the present printing start timing $T_0$ and the ends of each of the previous seven lines $l_1$ through $l_7$ and stores the measured results. The $TW_1$ is the duration between $T_0$ and the end of the power pulse HV of the previous line ($l_1$) (see FIG. 2). The $TW_2$ is the duration between $T_0$ and the end of the power pulse HV of two lines before ($l_2$). Also, $TW_7$ is the duration between $T_0$ and the end of the power pulse HV of seven lines before ($l_7$). Therefore, the inputs of the unit 4 are the signal $T_0$ and the power pulse HV. The measured results $TW_1$ through $TW_7$ in the unit 4 can be read out at the same time in the synchronized condition with the clock pulse (h), and the outputs of the unit 4 are applied to the comparator 5. If some of $TW_1$ through $TW_7$ exceed 10 milisecond, the measured duration is substituted to 10 milisecond in the unit 4. The other input of the comparator 5 is the output of the memory 6, which stores reference relationship between the pulse width of the power pulse HV and the heating duration between each lines corresponding to that pulse width as shown in the Table 1.

TABLE 1

| Address (pulse width mS) | Content (duration mS) |
|---|---|
| 1 (1.500) | 10.0 (=$w_1$) |
| 2 (1.375) | 7.0 (=$w_2$) |
| 3 (1.250) | 5.0 (=$w_3$) |
| 4 (1.125) | 3.5 (=$w_4$) |
| 5 (1.000) | 2.5 (=$w_5$) |
| 6 (0.875) | 1.5 (=$w_6$) |
| 7 (0.750) | 1.0 (=$w_7$) |
| 8 (0.625) | 0.5 (=$w_8$) |
| 9 (0.500) | 0.0 (=$w_9$) |
| 10 (0.500) | 0.0 (=$w_9$) |
| 11 (0.500) | 0.0 (=$w_9$) |
| 12 (0.500) | 0.0 (=$w_9$) |

The memory 6 has 12 areas each corresponding to the clock pulse $h_1$ through $h_{12}$. The address of the memory 6 is supposed to correspond to the pulse width, and the content of each address shows the reference duration for providing the desired density when the pulse width corresponding to the address is applied. For instance, the address 1 with the content 10 shows that the necessary pulse width is 1.5 mS for providing the desired density when the printing duration is 10 mS. Also, the address 5 with the content 2.5 shows that the necessary pulse width is 1.0 mS when the printing duration is 2.5 mS. The minimum pulse width when the printing duration is zero, is 0.5 mS. The addresses 10 through 12 of the memory 6 are provided just for simplifying the control of the apparatus. The content of the memory 6 is read out sequentially after $T_0$ by the clock pulse (h), that is to say, the address (1) is read out by the clock pulse $h_1$, the address (2) is read out by the clock pulse $h_2$, and the address (12) is read out by the clock pulse $h_{12}$. Of course the period of reading out each address is 125 μS. The line w of FIG. 2 shows the output of the memory 6.

The comparator 5 in FIG. 1 compares the outputs $TW_1$ through $TW_7$ of the unit 4 with the outputs $w_1$ through $w_7$ of the memory 6, respectively, and provides the comparison results $C_1$ through $C_7$. The comparison result $C_i$ is "1" when the output $TW_i$ of the unit 4 is larger than the output $w_i$ of the memory 6, and that result $C_i$ is "0" when the former is less than the latter. For instance, when $TW_1=3.0$ mS, $TW_2=5.0$ mS, $TW_3=9.5$ mS, and $TW_4=TW_5=TW_6=TW_7=10.0$ mS, the comparison results $C_1$ through $C_7$ are shown in the Table 2.

TABLE 2

| Clock pulse | Comparison result | | | | | | |
|---|---|---|---|---|---|---|---|
| | $C_1$ | $C_2$ | $C_3$ | $C_4$ | $C_5$ | $C_6$ | $C_7$ |
| $h_1$ | 3-10<0 0 $tw_1$-$w_1$ $tw_1$-$w_2$ | $tw_2$-$w_2$ 0 =5-10<0 $tw_2$-$w_2$ | $tw_3$-$w_1$ 0 9.5-10<0 | 1 12-10>0 | 1 | 1 | 1 |
| $h_2$ | 0 | 0 | 1 | 1 | 1 | 1 | 1 |
| $h_3$ | 0 | 1 | 1 | 1 | 1 | 1 | 1 |
| $h_4$ | 0 | 1 | 1 | 1 | 1 | 1 | 1 |
| $h_5$ | 1 | 1 | 1 | 1 | 1 | 1 | 1 |
| $h_6$ | 1 | 1 | 1 | 1 | 1 | 1 | 1 |
| . | . | . | . | . | . | . | . |
| . | . | . | . | . | . | . | . |
| . | . | . | . | . | . | . | . |
| $h_{12}$ | 1 | 1 | 1 | 1 | 1 | 1 | 1 |

The comparison results $C_1$ through $C_7$ in the Table 2 show which clock pulse ($h_1$ through $h_{12}$) should trigger the starting of the power pulse to a thermal element, depending upon the previous printing durations $l_1$ through $l_7$. That is to say, $h_1$ (0001111) shows the case that a thermal element is triggered at the timing of $h_1$ (and the pulse width in this case is 1.5 mS (=125 μS×12) when one of the heating durations $TW_1$ through $TW_7$ is longer than 10 mS (see Table 1). In this case, $TW_4$ through $TW_7$ are larger than 10 mS (since $C_4$ through $C_7$ are one), and $TW_1$ through $TW_3$ are shorter than 10 mS. Therefore, if the past three lines $l_1$ through $l_3$ are not energized or those three lines are white, thermal elements $1_1$ through $1_{32}$ are energized at the timing of $h_1$, and then, those energized elements are provided the pulse width of 1.5 mS.

Similarly, thermal elements are energized at the timing $h_2$ and obtain the pulse width 1.375 mS (=1.5−0.125), when the past two lines $l_1$ and $l_2$ are white in case of Table 2.

Similarly, thermal elements are energized at the timing $h_3$ or $h_4$ and obtain the pulse width 1.250 mS or 1.125 mS, when the past one line $l_1$ is white in case of Table 2.

After the timing $h_5$, thermal elements are triggered irrespective of the condition of past lines.

It should be appreciated that once a thermal element is energized, that thermal element is active until the power pulse HV stops, since a thermal element is conducted through a thyristor SCR, which continues the ON status once a gate signal is applied until the anode voltage becomes zero. Therefore, when a thermal element is energized at the timing $h_1$, that thermal element is active between $h_1$ through $h_{12}$.

The parallel outputs $C_1$ through $C_7$ of the comparator 7 are applied to the register 7, which converts the parallel signals $C_1$ through $C_7$ to the series signal $CS_i$. The first information of the series signal $CS_i$ is $C_7$ and the last information of that signal $CS_i$ is $C_1$. The $CS_1$ ($C_7$ through $C_1$) is provided within the one clock pulse duration ($h_2$-$h_1$) as shown in FIG. 2. Thus, each clock pulse $h_1$ through $h_{12}$ provides the each corresponding series signal $CS_1$ through $CS_{12}$. In $CS_1$, the first portion (a) corresponding to $C_7$ through $C_4$ is high level, and the latter portion (b) corresponding to $C_3$ through $C_1$ is low level as shown in FIG. 2.

The output ($CS_1$ through $CS_{12}$) of the resister 7 is applied to the S (set) input of the flip-flops $8_1$ through $8_{32}$ through the OR circuit 9, which also receives the clock pulse h ($h_1$ through $h_{12}$). Therefore, the flip-flops $8_1$ through $8_{32}$ are set to one at the initial stage of each timing period ($h_1$ through $h_{12}$) even when the output ($CS_1$ through $CS_{12}$) of the resister 7 is entirely at a low level. When a flip-flop $8_1$ through $8_{32}$ receives the S (set) signal from the OR circuit 9 and the R (reset) signal from the memory 10 at the same time, the S (set) signal has the priority, and the flip-flop is to set to one condition.

On the other hand, the white/black information of the past seven lines $l_1$ through $l_7$ for each dot are stored in the second memory 10. Those informations are;

For the first dot; $D_{11}$ through $D_{17}$
For the second dot; $D_{21}$ through $D_{27}$
For the i'th dot; $D_{i1}$ through $D_{i7}$
For the 32'th dot; $D_{321}$ through $D_{327}$.

It should be noted that the first portion of the suffix i of $D_{ij}$ shows the dot number, and the last portion j of the suffix shows the line number. The content of the memory 10 is read out by each clock signals $h_1$ through $h_{12}$ repetitively, and in each reading operation the oldest information $D_{i7}$ is read out first, and $D_{i6}$, $D_{i5}$, $D_{i4}$, $D_{i3}$, $D_{i2}$ and $D_{i1}$ are read out in sequence as shown in FIG. 2. Those read-out information from the memory 10 is applied to the R (reset) terminal of the flip-flops $8_1$ through $8_{32}$.

Accordingly, each flip-flop $8_1$ through $8_{32}$ is set to one according to the past printing lines $l_1$ through $l_7$, and is reset to zero according to the past printed information from the memory 10. Therefore, each flip-flop $8_1$ through $8_{32}$ remains to be set condition (one) at the end of each clock pulse duration only when the flip-flop is not reset by the output of the memory 10, after the last set signal is applied to the flip-flop. For instance, in the $h_1$ clock pulse duration, the flip-flops $8_1$ through $8_{32}$ are set to "one" four times by the comparison outputs $C_7$, $C_6$, $C_5$ and $C_4$ (see Table 2), and so if the last three printed informations $D_{i1}$, $D_{i2}$ and $D_{i3}$ in the i'th dot are completely zero, the i'th flip-flop $8_i$ can remain to be "one" at the end of the $h_1$ clock pulse duration.

The outputs of the flip-flops $8_1$ through $8_{32}$ are applied to the AND circuits $11_1$ through $11_{32}$, respectively, and those AND circuits provide the trigger signals $P_{t1}$ through $P_{t32}$. Those AND circuits $11_1$ through $11_{32}$ receive also the clock pulses $h_1$ through $h_{12}$. Therefore, the trigger pulse $P_{ti}$ for the i'th dot is generated at the end of the first clock pulse duration $h_1$ when the flip-flop $8_i$ is one at that timing. That trigger pulse $P_{ti}$ might be generated again at the end of the second clock pulse duration $h_2$ if the flip-flop $8_i$ is in one status at that timing, and so that trigger pulse might be generated a plurality times at the end of each clock pulse duration. Among those plurality of trigger pulses, only the first trigger pulse is effective to fire the thyristor SCR to determine the pulse width of the power pulse applied to the thermal element.

As described above, the trigger pulse $P_{ti}$ of the output of the AND circuit $11_i$ is applied to the thermal element $1_i$ through the AND circuit $3_i$, which also receives the black/white information of the present line from the memory 2. Therefore, if the dot to be printed is black, the power pulse applied to the thermal element rises at the timing of the trigger pulse and that power pulse finishes at the end of the power pulse HV. Therefore, by adjusting the timing of the trigger pulse or the rising point of the power pulse, according to the past printed dots in the past seven lines and the printing duration of the past seven lines, the pulse width of the power pulse applied to the thermal element is adjusted so that the color density or the printed concentration is appropriate.

Although the above embodiment describes the adjustment of the rising point of the power pulse, the other alternative that the rising point is fixed and the falling point is adjusted is also available. In that case, the arrangement of the Table 1 is reversed so that the address 1 includes 0.0 and the address 12 includes 10.0.

Figure 3:
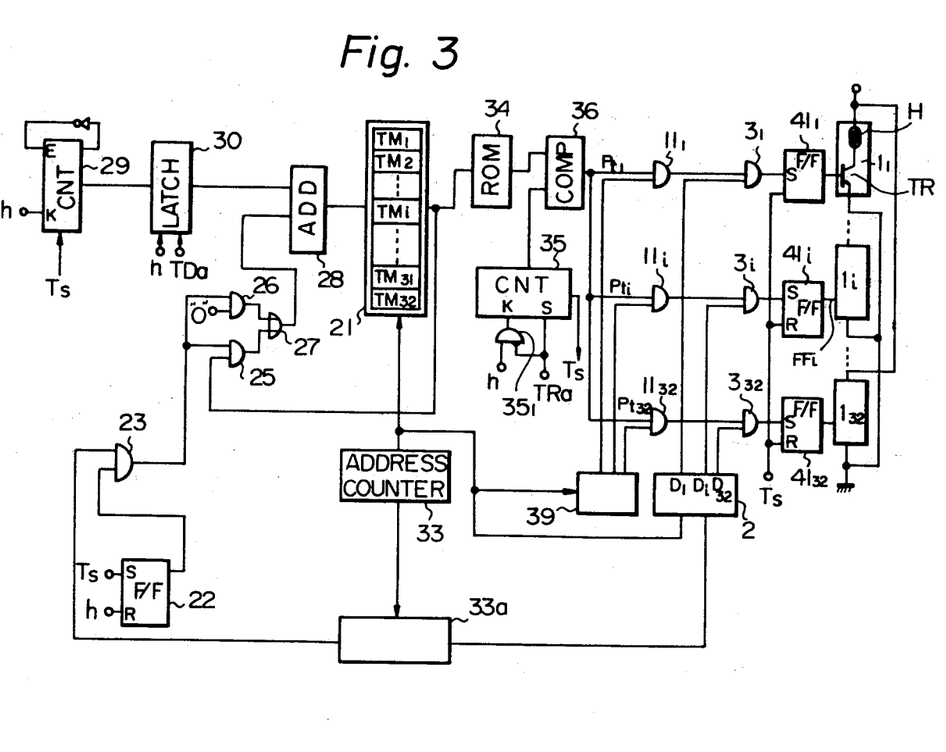
FIG. 3 is the block diagram of another embodiment of the thermal printing system according to the present invention.

FIG. 3 shows the block diagram of the second embodiment of the thermal printing system according to the present invention. In FIG. 3, the reference numeral $1_1$ through $1_{32}$ are thermal elements each having a heater H and a switching transistor TR, which is the replacement of a thyristor SCR in FIG. 1. One end of each heater H is connected to the power supply terminal HV, which applies the power pulse having the predetermined pulse width to the heaters H. The other end of the heaters is grounded through each of switching transistor TR. Those thermal elements $1_1$ through $1_{32}$ are aligned along a straight line for the dot matrix printing, and by selectively heating some thermal elements and transferring a thermal paper with the predetermined speed in the direction perpendicular to that aligned straight line of thermal elements, the desired pattern is printed on a paper. The control of the selective heating of thermal elements is performed by an integrated circuit memory (not shown) which stores the pattern to be printed for each character code.

Each thermal element is designed so that the desired color density or the concentration is obtained by heating the element by 1.8 milisecond (mS) with the predetermined power source from the power terminal HV, and the temperature of the element returns to the static or the normal temperature by 10 mS after heating.

The durating for printing a black dot for each thermal element, or the duration between the time that the last black dot was printed and the present time ($TR_a$) is measured and stored in the memory 21. In the memory 21, the symbol $TM_1$ shows the duration for the first dot printed by the first element $1_1$ between the time that the last black dot was printed and the present time ($TR_a$), and $TM_{32}$ shows the duration of the 32'th dot printed by the element $1_{32}$ between the time of the last printed black dot and the present time ($TR_a$). The durations $TM_1$ through $TM_{32}$ are measured using the clock pulse (h) which has the period of 150 $\mu S$ (see FIG. 4) and the measured result of the printing duration is quantized by the number of the clock pulses between the printing duration. Therefore, the measured result of printing duration is in the range from 0 to 67, in which 0 corresponds to the printing duration 0, and 67 corresponds to the printing duration 10.5 mS ($=0.15 \times 67$). When the printing duration is longer than 10.05 mS, the value 67 is stored in the memory 21.

The content of the memory 21 is read out in sequence according to the address designated by the address counter 33, and the read out information is applied to the read-only-memory Table 34. The address counter applies the address 1 through 32 to the memory 21, and when the content of the counter 33 is 1, the $TM_1$ is read out, and when the content of the counter 33 is 32, the $TM_{32}$ is read out.

The read-only-memory Table 34 stores the conversion table between the printing duration and the necessary pulse width for providing the desired color density, so the printing duration from the memory 21 is converted to the necessary pulse width of the power pulse in the conversion Table 34. The Table 34 has the information shown in the Table 3, and by applying the output of the memory 21 to the address (right column of the Table 2) of the read-only-memory 34, the quantized pulse width (PW) is obtained at the output of the conversion Table 34. The output of the Table 34 is quantized by the clock pulse (h) which has the period of 150 μS. So the output 12 at the address 67 means 1.8 mS (0.15×12), the output 11 at the addresses 66 through 52 means 1.65 mS (=0.15×11). The converted output of the Table 34 is applied to one input of the comparator 36, which provides the actual rise point of the power pulse.

TABLE 3

| Address (TM) | Content (PW) |
|---|---|
| 67 (10.05 msec) | 12 (1.80 msec) |
| 66 (9.90 msec) | 11 (1.65 msec) |
| 65 (9.75 msec) | 11 (1.65 msec) |
| . | . |
| . | . |
| . | . |
| 52 (7.80 msec) | 11 (1.65 msec) |
| 51 (7.65 msec) | 10 (1.50 msec) |
| . | . |
| . | . |
| . | . |
| 39 (5.85 msec) | 10 (1.50 msec) |
| 38 (5.70 msec) | 9 (1.35 msec) |
| . | . |
| . | . |
| . | . |
| 31 (4.65 msec) | 9 (1.35 msec) |
| 30 (4.50 msec) | 8 (1.20 msec) |
| . | . |
| . | . |
| . | . |
| 25 (3.95 msec) | 8 (1.20 msec) |
| 24 (3.80 msec) | 7 (1.05 msec) |
| . | . |
| . | . |
| . | . |
| 20 (3.00 msec) | 7 (1.05 msec) |
| 19 (2.85 msec) | 6 (0.90 msec) |
| . | . |
| . | . |
| . | . |
| 16 (2.40 msec) | 6 (0.90 msec) |
| 15 (2.25 msec) | 5 (0.75 msec) |
| . | . |
| . | . |
| . | . |
| 13 (1.95 msec) | 5 (0.75 msec) |
| 12 (1.80 msec) | 4 (0.60 msec) |
| . | . |
| . | . |
| . | . |
| 10 (1.50 msec) | 4 (0.60 msec) |
| 9 (1.35 msec) | 3 (0.45 msec) |
| . | . |
| . | . |
| . | . |
| 0 (0.00 msec) | 3 (0.45 msec) |

Figure 4:
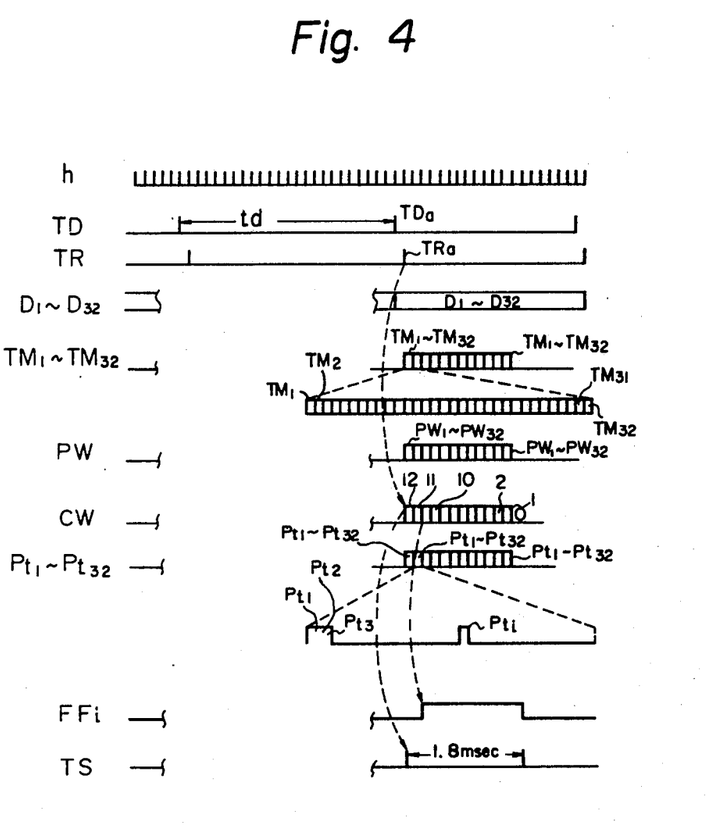
FIG. 4 is the operational time chart of the apparatus of FIG. 3.

The comparator 35 receives the reference input from the output of the counter 35, which is initiated to the value 12 by the print start pulse ($TR_a$) as shown in CW of FIG. 4 and is decremented one by one by the clock pulse (h) until the content of the counter 35 reaches zero. The clock pulse (h) is applied to the decrement input K of the counter 35 through the AND circuit $35_1$. The comparator 36 compares the output of the conversion Table 34 with the output of the counter 35, and when two inputs coincides with each other, the comparator 36 provides the output signals which operate as the trigger pulses $P_{t1}$ through $P_{t32}$, each of which is obtained when the corresponding content $TM_1$ through $TM_{32}$ in the memory 21 is read out. The output of the comparator 36 is applied to one input of the AND circuits $11_1$ through $11_{32}$, each of which is also provided the gate signal from the output of the decoder 39. The decoder 39 decodes the output of the address counter 33 and the decoded outputs are applied to each of the AND circuits $11_1$ through $11_{32}$. Therefore, when the address counter 33 designates the i'th address $TM_i$ of the memory 21, the decoder 39 also provides the i'th output to the AND circuit $11_i$, and then, the trigger pulse $P_{ti}$ which reflects the printing duration $TM_i$ is obtained at the output of the AND circuit $11_i$.

Each of the outputs of the AND circuits $11_1$ through $11_{32}$ is "one" during the counter 35 has the particular content, and is zero during the counter 35 has other contents. Each output of those AND circuits $11_1$ through $11_{32}$ is applied to one input of each of the AND circuits $3_1$ through $3_{32}$. Each of the AND circuits $3_1$ through $3_{32}$ receives also the output of the memory 2, which provides black/white information $D_1$ through $D_{32}$ to be printed to each dot at the present line ($l_0$). Therefore, when the memory 2 designates the black dot in the i'th dot $D_i$, the AND circuit $3_i$ provides the output signal when the trigger pulse $P_{ti}$ is applied from the comparator 36.

The output signal of the AND circuit $3_i$ sets the corresponding flip-flop $41_i$ to one state, and that flip-flop $41_i$ is reset to zero by the print end signal $T_s$ (see FIG. 4). The end signal $T_s$ also has the paper transfer by one line. Therefore, when the flip-flop $41_i$ is in one state, the switching transistor TR of the corresponding dot is conducted, and then, the corresponding heater H of the thermal element is energized during the same duration. Thus, the pulse width applied to the thermal element is adjusted according to the printing duration, and the optimum color density is obtained.

Now, the revision of the memory 21 is described in accordance with FIG. 3.

First, in the memory 21, if the present dot is black (that is to say, the thermal element is energized), the content $DM_i$ which is the printing duration for that black dot is changed to zero, and other contents relating to white dots are unchanged. This operation is carried out by the flip-flop 22, the AND circuits 23, 25 and 26, and the OR circuit 27. The flip-flop 22 is set to one by the print end signal $T_s$ and is reset to zero by the clock pulse (h), then, the flip-flop 22 is in ON state during one clock period when the printing operation finishes, and the AND circuit 23 opens during the same duration. The AND circuit 23 opens either the AND circuit 25 or the AND circuit 26. The previous data $TM_i$ in the memory 21 is applied to the AND circuit 25, and "0" data is applied to the other AND circuit 26. The previously printed data $D_i$ is provided from the memory 2 through the selector 33a, which selects the data in the memory 2 according to the address designated by the address counter 33. When the printed data $D_i$ is white or zero, the AND circuit 23 is closed, and then, the AND circuit 25 which receives the previous output $TM_i$ from the memory 21 is opened. Thus, the previous output $TM_i$ passes the AND circuit 25 and the OR circuit 27, and is stored again in the memory 21 through the adder 28. At this time, the latch circuit 30 provides no output, and that adder 28 provides the same sum as the output of the OR circuit 27. Thus, when the printed data $D_i$ is zero or white, the memory 21 is not changed at this stage. On the other hand, the printed data $D_i$ is one or black, the AND circuits 23 and 26 are opened, and the AND circuit 25 is closed. Thus, the "0" input applied to the AND circuit 26 passes through the circuits 26, 27 and 28 and is stored in the memory 21. Thus, when the printed data $D_i$ is one or black, the corresponding area $TM_i$ is changed to zero.

Next, when the printed data $D_i$ is white, the corresponding content $TM_i$ in the memory 21 is revised by adding the printing time of the present line to the previous data $TM_i$. This operation is carried out by the counter 29, the latch circuit 30 and the adder 28. The counter 29 is reset to zero by the print end signal $T_s$ of the previous cycle, and is incremented each time the clock signal (h) is applied to the K input terminal of the counter 29. It is supposed that the counter 29 stops the counting when the content of the same reaches 67. The inverter 29 inserted between the output and the input of the counter 29 effects that stop by applying the signal to the enable input terminal E when the counter 29 overflows.

Since the period of the clock pulse (h) is 150 $\mu$S, the content of 67 corresponds to the printing duration of 10.05 mS ($=0.15 \times 67$). The content of the counter 29 is transferred to the latch circuit 30 by the printing start signal $TD_a$, and is held in that latch circuit 30 during the whole printing cycle. The output of the latch circuit 30 is applied to one input of the adder 28, the other input of which receives the previous data $TM_1$ through $TM_{32}$ of the printing duration from the memory 21. Therefore, the sum of the previous data $TM_1$ through $TM_{32}$ and the content of the counter 29 which shows the printing time of the present line is obtained at the output of the adder 28, and that sum is stored again in the memory 21. In this case, it is supposed that the adder 28 provides the sum 67 when the sum exceeds 67.

As described above, the content of the memory 21 is changed to zero when the present dot is black, or that content is revised by adding the present printing duration to the previous data when the present dot is white. Thus, the memory 21 provides always the printing duration of each dot.

FIG. 4 shows the operational time chart of the apparatus of FIG. 3. In FIG. 4, the clock pulse (h) appears in every 150 $\mu$S. The TD shows the timing that the data to be printed is applied to the memory 2. The duration $t_d$ between each TD pulses is not constant. The printing start pulse TR is generated in a short time after each TD pulse. The data memory 2 is revised to the new data by the TD pulse. The revision of the memory 21 is finished between the present data reception signal $TD_a$ and the present printing start pulse $TR_a$. The $TM_1-TM_{32}$ in FIG. 4 shows the read out of the printing duration $TM_1-TM_{32}$ from the memory 21. As apparent from FIG. 4, the data $TM_1$ through $TM_{32}$ are read out when the present printing start signal $TR_a$ appears, and are read out repetitively in every clock cycle. And in each clock cycle, the data $TM_1$ through $TM_{32}$ are read out in series.

Also, the output PW of the conversion Table 34 is read out from the Table 34 repetitively by the clock pulse (h), and in each clock cycle, that output PW is read out in series.

The output CW of the counter 35 is 12 when the printing start pulse $TR_a$ appears, and that output CW is decremented one by one every time the clock pulse (h) is provided. When the counter 35 reaches zero, the print end signal $T_s$ is provided from the counter 35.

The comparator 36 provides the outputs $P_{t1}$ through $P_{32}$ in every clock cycle, and $P_{ti}$ is defined by the output PW of the conversion Table 34, and the counted output of the counter 35. For instance, when the printing durations $TM_1$, $TM_2$, $TM_3$ and $TM_i$ for the first, the second, the third and the i'th dot, respectively, are between 7.8 mS and 9.9 mS, that is to say, when the value in the memory 21 for those dots is between 52 and 66, the output of the comparator 36 for those dots is one when the output CW of the counter 35 is 11 (see Table 3). Other dots make the output of the comparator 36 one when the counter 35 is in other value.

The $FF_i$ in FIG. 4 shows the output $FF_i$ of the flip-flop $41_i$ and that flip-flop is set to one when the output CW of the counter 35 is 11, to start the energization of the thermal element, and is reset to zero by the printing end signal $T_s$ which is generated after 1.8 mS from the printing reference signal $TR_a$.

Figure 5:
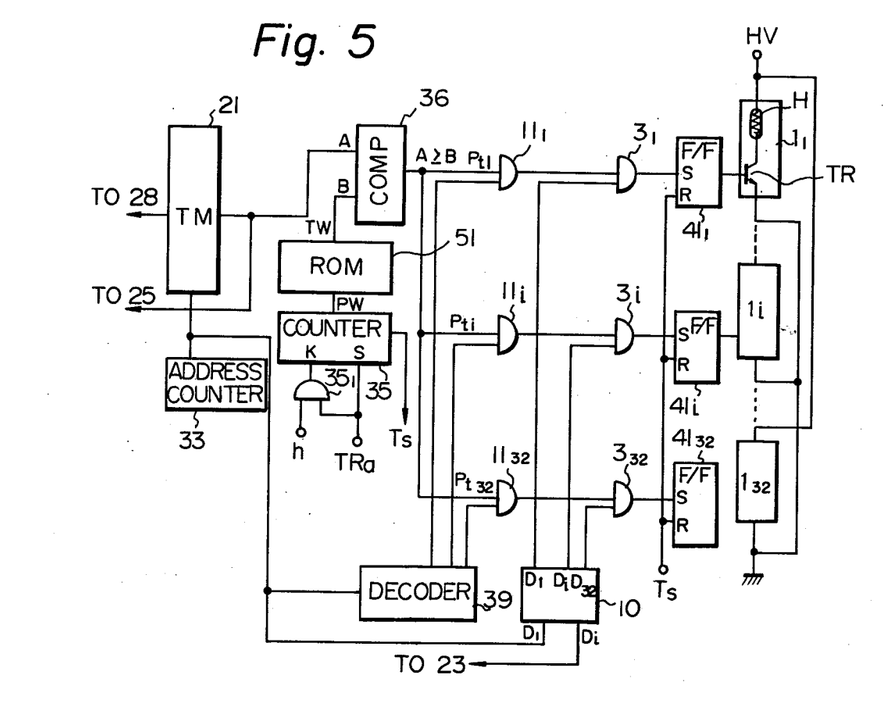

FIG. 5 shows the modification of the apparatus of FIG. 3, and the feature of the apparatus of FIG. 5 is that the conversion Table 51 implemented by a read-only-memory is provided between the comparator 36 and the counter 35, while the conversion Table 34 in FIG. 3 is provided between the memory 21 and the comparator 36. Other portions of FIG. 5 are the same as those of FIG. 3.

Accordingly, the conversion Table 51 in FIG. 5 converts the output of the counter 35, while the conversion Table 34 in FIG. 3 converts the output of the memory 21. And the comparator 36 in FIG. 5 compares the output of the memory 21 with the output of the conversion Table 51.

The conversion Table 51 has 12 addresses corresponding to the content of the counter 35, and in each address the integer 67 through 0 is stored as shown in the Table 4. The content 67 through 0 in the table is the quantized value by the clock pulse of the period 150 $\mu$S, so the value 67 means 10.05 mS ($=0.15 \times 67$), and the value 52 in the address 11 means 7.8 mS ($=0.15 \times 52$).

TABLE 4

| Address (PW) | Content (TW) |
| --- | --- |
| 12 (1.8 msec) | 67 (10.05 msec) |
| 11 (1.65 msec) | 52 (7.80 msec) |
| 10 (1.50 msec) | 39 (5.85 msec) |
| 9 (1.35 msec) | 31 (4.65 msec) |
| 8 (1.20 msec) | 25 (3.95 msec) |
| 7 (1.05 msec) | 20 (3.00 msec) |
| 6 (0.90 msec) | 16 (2.40 msec) |
| 5 (0.75 msec) | 13 (1.95 msec) |
| 4 (0.60 msec) | 10 (1.50 msec) |
| 3 (0.45 msec) | 0 (0.00 msec) |

In this embodiment, the measured printing duration from the memory 21 is compared with the converted output of the Table 51, and when the former exceeds the latter, the comparator 36 provides the output, which triggers energization of the corresponding thermal element.

As described above in detail, according to the present invention, the pulse width or the power applied to each thermal element is adjusted according to the previous data of printing and/or the printing speed. Therefore, the high speed printing that the printing duration between each lines is less than 10 mS is possible by controlling the pulse width applied to an individual thermal element. Therefore, a high speed thermal printer system can be achieved.

Further, the present thermal printing system is advantageous for the use of a facsimile receiver, in which the reception rate of the information is variable. In this case, even when the reception rate of the information is high, the present printer can print the reception signal without losing the information by shortening the printing duration.

From the foregoing it will now be apparent that a new and improved thermal printing system has been found. It should be understood of course that the embodiments disclosed are merely illustrative and are not intended to limit the scope of the invention. Reference should be made to the appended claims, therefore, rather than the specification as indicating the scope of the invention.

What is claimed is:
1. A thermal printing system comprising;
  (a) a plurality of thermal elements each having a heater and a switching means connected series to said heater, one end of each heater being connected to a power supply which provides the predetermined width of repetitive power pulse, and the other end of the switching means being grounded, said thermal elements being aligned on a straight line with close relations to each other contacting a thermal paper in the direction perpendicular to the moving direction of a thermal paper,
  (b) first digital memory which stores the black/white information to be printed for each dot,
  (c) second digital memory which stores the information relating to the previously printed information for each dot,
  (d) conversion means for converting the output of the second digital memory to the trigger timing pulse for initiating the heating of each thermal element, and
  (e) AND circuit means for providing the logical product of said trigger timing pulse and the output of said first digital memory to fire each thermal element.

2. A thermal printing system according to claim 1, wherein said second digital memory stores the black/white information of the predetermined number of previously printed lines for each dot, and said conversion means comprises of a printing period measuring unit (4) which measures the duration between the reference start timing $T_0$ of the present line ($l_0$) and the ends of the previously printed lines ($l_7$–$l_1$), the other memory (6) which stores the relationship between the preferably pulse width applied to a thermal element and the heating duration between the present line and the previously printed line, a comparator means (5) for comparing the output of said printing period measuring unit with the output of said the other memory, a plurality of flip-flops ($8_1$–$8_{32}$) each controlled by being set by the output of said comparator and by being reset by the output of said second memory, and the other AND circuit means ($11_1$–$11_{32}$) for providing the logical product of the output of said flip-flops and a clock timing pulse to provide said trigger timing pulse.

3. A thermal printing system according to claim 2, wherein said predetermined number of previously printed lines stored in said second memory is seven lines.

4. A thermal printing system according to claim 1, wherein said second digital memory stores the duration between the present time and the time that the previous last black dot was printed by the particular thermal element, said second digital memory is revised every time a new line is printed by clearing the content to zero for dots which are printed black, and by adding the content to the time requested to printing the present line for dots which are printed white, and said conversion means comprises of a conversion Table (34) implemented by a read-only-memory storing the relationship between the previously printed black dot stored in the second digital memory and the necessary pulse width of a power pulse applied to a thermal element, a counter (35) for providing a clock timing pulse (h), a comparator (36) for comparing the output of said conversion table and the output of said counter, and means ($11_1$–$11_{32}$, 39) for distributing the output of said comparator to each dot to provide a trigger timing pulse.

5. A thermal printing system according to claim 4, wherein said second digital memory stores only when the printing duration is less than 10 mS, and when said printing duration is longer than 10 mS, the memory stores the value of 10 mS.

6. A thermal printing system according to claim 4, wherein the conversion table converts the output of the counter and the comparator compares the output of the second digital memory with the output of the conversion table.

* * * * *